United States Patent Office 3,126,396
Patented Mar. 24, 1964

3,126,396
NOVEL BICYCLO(2,2,2)OCTANE DERIVATIVES
Keizo Kitahonoki, 848 Nabata, Ikoma-machi, Ikoma-gun, Japan, and Akiko Irie, 5-3 Senriyama, Suita-shi, Osaka, Japan
No Drawing. Filed Sept. 7, 1961, Ser. No. 136,434
Claims priority, application Japan June 9, 1958
20 Claims. (Cl. 260—319)

This invention relates to compositions of matter, particularly organic and pharmaceutical intermediates and their methods of preparation, and more particularly to compounds having value as intermediates in the preparation of therapeutic compounds possessing hypotensive activity.

Specifically this invention relates to dialkylaminoalkyl imides, dialkenylaminoalkyl imides and heterocyclicaminoalkyl imides of bicyclo(2,2,2)octano-2,3-dicarboxylic anhydrides and their reduction products.

It is a basic object of the present invention to provide novel organic compounds and methods for the preparation thereof.

It is another object of the invention to provide novel and useful intermediates in the preparation of novel, physiologically active compounds characterized by chemotherapeutic or medicinal properties, particularly hypotensive activity.

These and other objects and the manner in which they are accomplished will become apparent to those conversant with the art from the following description of the general class of compounds and certain specific examples of particular members thereof as well as general and specific methods of their preparation.

The compounds falling within the scope of the present invention may be represented by the following formula:

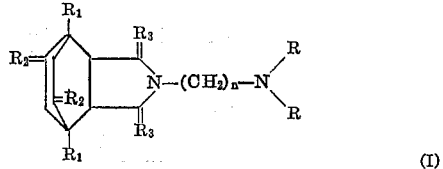

In this formula, $n$ is an integer from 2 to 5, R represents a lower alkyl (methyl, ethyl, propyl, butyl and amyl) or alkenyl (vinyl, allyl, butenyl and pentenyl) radical with up to 5 carbon atoms, $R_1$ represents a hydrogen atom or a lower alkyl (methyl, ethyl, propyl) radical with from 1 to 3 carbon atoms, $R_2$ represents

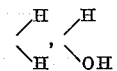

or =O and $R_3$ represents

or =O. The structure

may also represent an -N(saturated) heterocyclic ring structure, e.g. morpholino, piperidino, pyrrolidino, piperazino and N-methyl piperazino. The lower alkyl or alkenyl radicals may be the same or different, even if represented by the same symbol.

The novel compounds of the invention may be prepared according to the methods shown in the following schema:

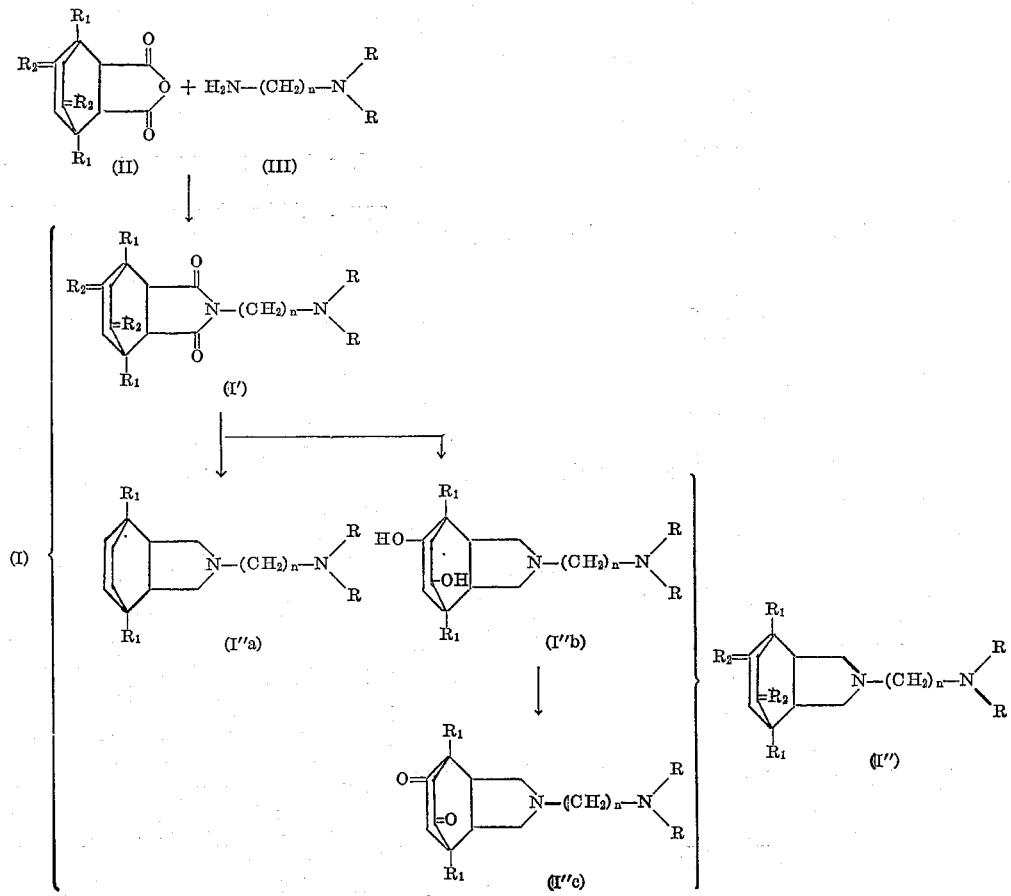

wherein $n$, $R$, $R_1$ and $R_2$ have the same significance as stated above.

The starting compounds of Formula (II) can be obtained by Diels-Alder reaction of aromatic compounds with maleic anhydride [cf. Pharm. Bull. (Japan), 4, 12 (1956)], and those are exemplified as follows:

Bicyclo(2,2,2)octano - 5,7-dioxo - 2,3-dicarboxylic anhydride

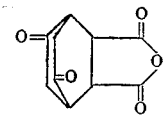

(IIa)

Bicyclo(2,2,2)octano - 5,7 - dihydroxy - 2,3 - dicarboxylic anhydride

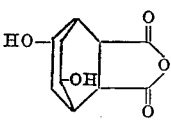

(IIb)

Bicyclo(2,2,2)octano-2,3-dicarboxylic anhydride

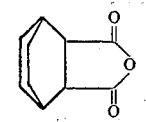

(IIc)

Bicyclo(2,2,2)octano - 1,4 - dimethyl-5,7-dioxo-2,3-dicarboxylic anhydride

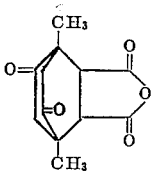

(IId)

Bicyclo(2,2,2)octano - 1 - methyl-4-ethyl-2,3-dicarboxylic anhydride

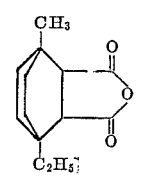

(IIe)

Bicyclo(2,2,2)octano - 1,4 - dimethyl - 2,3 - dicarboxylic anhydride

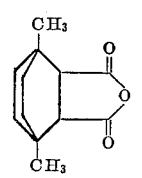

(IIf)

The other starting compounds of Formula III are exemplified as follows:

N-dimethylaminoethylamine

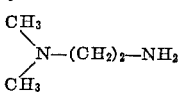

(IIIa)

N-methylethylaminoethylamine

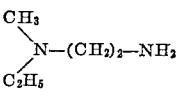

(IIIb)

N-diethylaminopropylamine

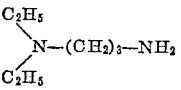

(IIIc)

N-diethylaminobutylamine

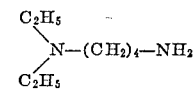

(IIId)

N-dibutylaminobutylamine

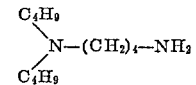

(IIIe)

N-dimethylaminopropylamine

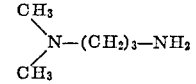

(IIIf)

N-diallylaminobutylamine

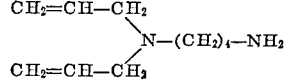

(IIIg)

Pyrrolidinoethylamine

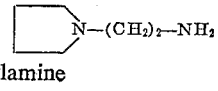

(IIIh)

Morpholinopropylamine

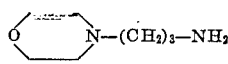

(IIIi)

All compounds of the Formula II, e.g. IIa to f can be reacted with any compound of the Formula III, e.g. IIIa to i. The reaction of the anhydride of Formula II with the amine of Formula III is easily carried out by refluxing in a suitable solvent. Hydrophilic solvents, such as dioxane, acetone and acetic acid are preferred. The reaction also proceeds without solvent, but the yield is ordinarily unsatisfactory. Owing to the activity of the anhydrides, there is no need for a catalyst in this reaction when a solvent is employed. After removal of the reaction solvent in vacuo, the crude product may be recrystallized from a suitable organic solvent, such as ethyl acetate, ethyl ether, methanol, ethanol and acetone, to give the corresponding pure imides of Formula I'. Alternatively, the imide may be isolated directly from the reaction mixture by vacuum distillation.

The thus obtained imide is reduced to the corresponding base of Formula I''a or I''b by the use of a reducing agent. Although any of general reducing agents, such as (a) alkali metal hydride, (b) metal and acid or (c) metal and alkali, can be used, an alkali metal hydride is most suitable for this reduction. For instance, the reaction proceeds readily by stirring the imide (I') with lithium aluminum hydride in tetrahydrofuran and ethyl ether for several hours at a temperature within the range of from about 20° to about 60° C. The resulting free bases are isolated by vacuum distillation from the ethyl ether-tetrahydrofuran layer after decomposing excess reducing agent with water. Since reducible substituents of the bicyclo(2,2,2)octane nucleus, namely: oxygen atoms at the position 5 and 7, are reduced at the same time as the reduction of the imides, the undesirably reduced substituents may be subsequently oxidized selectively to their former unreduced forms. For instance, free base of Formula I''b can be oxidized with chromic anhydride and acetic acid to corresponding free base of Formula I''c. Alternatively, such reducible substituents may be protected by suitable means prior to reduction.

Thus obtained imides of Formula I' and free bases of Formula I'' are useful as intermediates for the preparation of effective agents in the treatment of cardiovascular dieseases, particularly hypertension. Namely: these compounds may be converted to acid addition or quaternary salts by reaction with acids or alkyl, halides, respectively, in suitable media. The resulting acid addition or quaternary salts possess a marked hypotensive activity, i.e. relieve hypertension, in mammals at a low dosage level and at the same time a favorable ratio; they possess pharmaceutical activity with respect to the nervous system of higher mammals, e.g. ganglion blocking action and paralyzing action of motor end-plates in skeletal muscle.

The following examples illustrate the synthesis in detail. They are presented by way of illustration only and not as limiting the scope of the invention.

EXAMPLE 1

1′-(ω-Dimethylaminoethyl)-5,7,2′,5′-Tetraoxo-Bicyclo-(2,2,2)Octano(2,3:3′,4′)Pyrrolidine

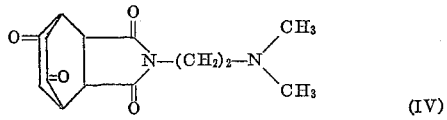
(IV)

To a solution of 8 g. (grams) of bicyclo(2,2,2) octano-5′7-dioxo-2,3-dicarboxylic anhydride in 200 cc. of dioxane, another solution of 3.4 g. of N-dimethylaminoethylamine in 40 cc. of dioxane is added dropwise. The mixture is refluxed over an oil bath at about 120° C. for 6 hours. Then, the dioxane is distilled off in vacuo to give 10.994 g. of oily mass, which gradually crystallize on standing. Recrystallization from acetone gives 1′-(ω-dimethylaminoethyl) - 5,7,2′,5′ - tetraoxo - bicyclo (2,2,2) octano (2,3:3′,4′)pyrrolidine as colorless needles, M.P. (melting point) 149° C.

Analysis.—Calcd. (analysis calculated) for

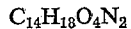

C, 60.42; H, 6.52; N, 1007. Found: C, 60.44; H, 6.78; N, 9.69.

EXAMPLE 2

1′-(ω-Dimethylaminopropyl)-5,7,2′,5′-Tetraoxo-Bicyclo-(2,2,2)Octano(2,3:3′,4′)Pyrrolidine

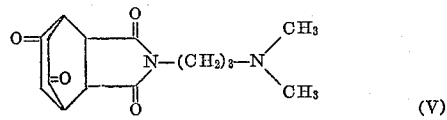
(V)

To a solution of 2 g. of bicyclo(2,2,2)octano-5,7-dioxo-2,3-dicarboxylic anhydride in 200 cc. of dioxane, another solution of 0.98 g. of N-dimethylaminopropylamine in 50 cc. of dioxane is added dropwise. The mixture is refluxed over an oil bath at 120° C. for 11 hours. Then, the dioxane is distilled off in vacuo to give 2.1 g. of the crude product. Recrystallization from acetone gives 1′ - (ω-dimethylaminopropyl) - 5,7,2′,5′-tetraoxo-bicyclo (2,2,2)octano(2,3:3′,4′)pyrrolidine as yellow needles, M.P. 135° to 136° C.

Analysis.—Calcd. for $C_{15}H_{20}O_4N_2$: C, 61.63; H, 6.90; N, 9.58. Found: C, 61.52; H, 7.03; N, 9.41.

EXAMPLE 3

1′-(ω-Diethylaminobutyl)-5,7,2′,5′-Tetraoxo-Bicyclo-(2,2,2)Octano(2,3:3′,4′)Pyrrolidine

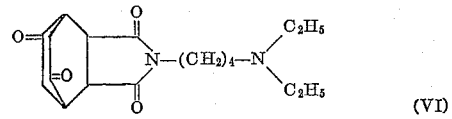
(VI)

To a solution of 10 g. of bicyclo(2,2,2)octano-5,7-dioxo-2,3-dicarboxylic anhydride in 50 cc. of dioxane, another solution of 8.5 g. of N-diethylaminobutylamine in 80 cc. of dioxane is added dropwise. The mixture is refluxed over an oil bath at about 125° C. for 4 hours. Then, the dioxane is distilled off in vacuo to give 18.3 g. of orange oil. To 1.533 g. of the oil, 1 g. of hydrobromic acid is added; the product is then evaporated to dryness. The residue is recrystallized from ethyl alcohol to give 1.019 g. of 1′-(ω-diethylaminobutyl)5,7,2′,5′-tetraoxo - bicyclo(2,2,2)octano(2,3:3′,4′)pyrrolidine monohydrobromide as needles, M.P. 216° to 217° C. (dec.).

Analysis.—Calcd. for $C_{18}H_{26}O_4N_2 \cdot HBr$: C, 52.05; H, 6.55; N, 6.74; Br, 19.24. Found: C, 52.07; H, 6.64; N, 6.90; Br, 18.81.

A solution of 1.019 g. of the monohydrobromide in 10 cc. of water is made alkaline with potassium carbonate and extracted with chloroform. After drying over anhydrous sodium sulfate, the solvent is removed. Recrystallization of the residue from acetone-ethyl ether gives 0.390 g. of 1′-(ω-diethylaminobutyl)-5,7,2′,5′-tetraoxo-bicyclo(2,2,2)octano(2,3:3′,4′)pyrrolidine as needles.

Analysis.—Calcd. for $C_{18}H_{26}O_4N_2$: C, 64.65; H, 7.84; N, 8.38. Found: C, 64.91; H, 7.46; N, 8.53.

EXAMPLE 4

1′-(ω-Dimethylaminopropyl)-1,4-Dimethyl-5,7,2′,5′-Tetraoxo-Bicyclo(2,2,2)Octano(2,3:3′,4′)Pyrrolidine

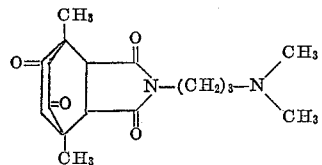
(VII)

To a solution of 3 g. of bicyclo(2,2,2)octano-1,4-dimethyl-5,7-dioxo-2,3-dicarboxylic anhydride in 75 cc. of dioxane, another solution of 1.3 g. of N-dimethylaminopropylamine in 50 cc. of dioxane is added dropwise. The mixture is refluxed in an oil bath at 120° C. for 6 hours. Then, the dioxane is distilled off to give 4.362 g. of crude oil. Removing ethyl ether-insoluble impurities, the oil obtained is distilled in vacuo to give 2.256 g. of 1′-(ω-dimethylaminopropyl) - 1,4 - dimethyl-5,7,2′,5′-tetraoxobicyclo(2,2,2)octano(2,3:3′,4′)pyrrolidine, B.P. (boiling point) 180° C. (0.01 mm. Hg).

Analysis.—Calcd. for $C_{17}H_{24}O_4N_2$: C, 63.73; H, 7.55; N, 7.74. Found: C, 63.22; H, 7.74; N, 8.29.

EXAMPLE 5

1′-(ω-Dimethylaminoethyl)-5,7-Dihydroxy-Bicyclo(2,2,2)Octano(2,3:3′,4′)Pyrrolidine

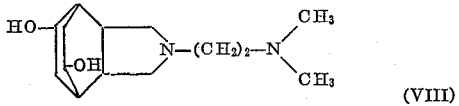
(VIII)

A solution of 4.65 g. of 1′-(ω-dimethylaminoethyl)-5,7,2′,5′ - tetraoxo-bicyclo(2,2,2)octano(2,3:3′,4′)pyrrolidine (see Example 1.) in 93 cc. of absolute tetrahydrofuran is added, while stirring, to a solution of 3.16 g. of lithium aluminum hydride in 150 cc. (cubic centimeters) of absolute ethyl ether-tetrahydrofuran (1:2 by volume) at from 23° to 30.5° C. The dropwise addition takes 1.5 hours. The mixture is then heated at 47.7° C. for 6.75 hours with stirring. During heating 50 cc. more of absolute ethyl ether are added; then the resulting mixture is allowed to stand overnight (about 12 hours). After the addition of 16 cc. of water, the mixture is stirred at room temperature (about 20° C.) for 1.5 hours; the ethyl ether-tetrahydrofuran solution is separated by decantation, e.g. from separating funnel; the residue is extracted three times with ether; and the extracts are combined with the ethyl ether-tetrahydrofuran solution separated above and dried over anhydrous sodium sulfate. Removing the solvent, 3.12 g. of oily residue results. After purifying by a distillation in vacuo, the crude product is recrystallized from acetone to give 1′-(ω-dimethylaminoethyl) - 5,7 - dihydroxy - bicyclo(2,2,2)octano (2,3:3′,4′)pyrrolidine as boat-shaped crystals, M.P. 142° to 144° C.

Analysis.—Calcd. for $C_{14}H_{26}O_2N_2$: C, 66.10; H, 10.30; N, 11.01. Found: C, 66.17; H, 10.37; N, 10.82.

EXAMPLE 6

*1'-(ω-Dimethylaminopropyl)-5,7-Dihydroxy-Bicyclo (2,2,2)Octano(2,3:3',4')Pyrrolidine*

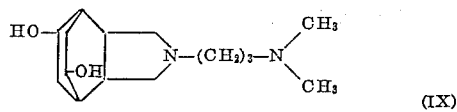

(IX)

A solution of 5 g. of 1'-(ω-dimethylaminopropyl)-5,7,2',5' - tetraoxo-bicyclo(2,2,2)octano(2,3:3',4')pyrrolidine (see Example 2) in 80 cc. of absolute tetrahydrofuran is added dropwise, with stirring, to a solution of 3 g. of lithium aluminum hydride suspended in 100 c.. of absolute ethyl ether-tetrahydrofuran (1:1 by volume) at from 32° to 34° C. The dropwise addition takes 2 hours. The mixture is heated at from 52° to 55° C. for 2 hours with stirring. Then, 1 g. of lithium aluminum hydride is added, and stirring is continued for 1.5 hours more. The excess reducing agent is decomposed by addition of water. After stirring at room temperature (about 20° C.) for 1 hour, the ethyl ether-tetrahydrofuran solution is separated by decantation, the residue is extracted several times with diethyl ether, and the extracts are combined with the ethyl ether-tetrahydrofuran solution separated above and dried over anhydrous sodium sulfate. Removing the solvent by distillation, the crude oil obtained is purified by distillation in vacuo to give 2.2 g. of 1' - (ω - dimethylaminopropyl) - 5,7 - dihydroxy - bicyclo (2,2,2)octano(2,3:3',4')pyrrolidine, B.P. 160° C. (0.01 mm. Hg).

EXAMPLE 7

*1'-(ω-Dimethylaminopropyl)-5,7-Dioxo-Bicyclo (2,2,2)Octano(2,3:3',4')Pyrrolidine*

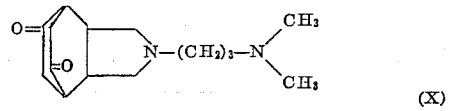

(X)

To a solution of 1.247 g. of 1'-(ω-dimethylaminopropyl) - 5,7 - dihydroxy-bicyclo(2,2,2)octano(2,3:3',4') pyrrolidine, the free base obtained in Example 6, in 20 cc. of glacial acetic acid, another solution of 0.813 g. of chromic anhydride in 10 cc. of glacial acetic acid is added dropwise with ice-cooling and the mixture is allowed to stand overnight (about 12 hours) in a refrigerator (at 5° C.). After filtration, the excess oxidizing agent is decomposed by addition of 6 cc. of ethyl alcohol. Evaporating to dryness, the residue is dissolved in 10 cc. of water, acidified (pH<7) with hydrochloric acid and washed with ethyl acetate to remove neutral impurities. The aqueous solution is adjusted to pH 8.5 with potassium carbonate and extracted several times with chloroform. The extracts are combined and dried over anhydrous sodium sulfate. Removing the solvent, 0.789 g. of oily product is obtained. A distillation in vacuo gives 0.238 g. of pale yellow oil, which spontaneously crystallizes. Recrystallizing from petroleum-ether, there is yielded 0.092 g. of 1' - (ω-dimethylaminopropyl) - 5,7 - dioxo-bicyclo (2,2,2)octano(2,3:3',4')pyrrolidine as colorless plates, M.P. 82° to 84° C.

*Analysis.*—Calcd. for $C_{15}H_{24}O_2N_2$: C, 68.15; H, 9.15; N, 10.60. Found: C, 67.99; H, 9.43; N, 10.74.

EXAMPLE 8

*1'-(ω-Diethylaminobutyl)-5,7-Dihydroxy-Bicyclo (2,2,2)Octano(2,3:3',4')Pyrrolidine*

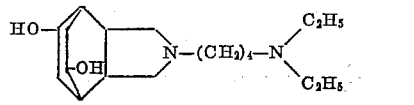

(XI)

A solution of 3.634 g. of 1'-(ω-diethylaminobutyl)-5,7,2',5' - tetraoxo - bicyclo(2,2,2)octano(2,3:3',4')pyrrolidine (see Example 3) in 60 cc. of absolute ethyl ethertetrahydrofuran (1:1 by volume) is added dropwise, with stirring, to a solution of 2.2 g. of lithium aluminum hydride suspended in 150 cc. of absolute ethyl ether-tetrahydrofuran (1:1 by volume). The mixture is refluxed 4 hours at 48° C. with stirring. Then, the excess reducing agent is decomposed by the addition of 40 cc. of water. After stirring at room temperature for 0.5 hour, the ethyl ether-tetrahydrofuran solution is separated by decantation, and the residue is extracted several times with tetrahydrofuran. The extracts are combined with the ethyl ether-tetrahydrofuran solution separated above and dried over anhydrous sodium sulfate. Removing the solvent by distillation, the crude oil obtained is purified by a distillation in vacuo to yield 1.753 g. of 1'-(ω-diethylaminobutyl) - 5,7 - dihydroxy-bicyclo(2,2,2) octano(2,3:3',4')pyrrolidine, B.P. 191° to 193° C. (0.005 mm. Hg).

*Analysis.*—Calcd. for $C_{18}H_{34}O_2N_2 \cdot \frac{1}{4}H_2O$: C, 68.63; H, 11.04; N, 8.89. Found: C, 68.52; H, 11.28; N, 8.77.

EXAMPLE 9

*1'-(ω-Dimethylaminopropyl)-1,4-Dimethyl-5,7-Dihydroxy-Bicyclo(2,2,2)Octano(2,3:3',4')Pyrrolidine*

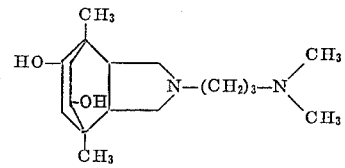

(XII)

A solution of 1.96 g. of 1'-(ω-dimethylaminopropyl)-1,4 - dimethyl - 5,7,2',5' - tetraoxo-bicyclo(2,2,2)octano (2,3:3',4')pyrrolidine (see Example 4) in 20 cc. of absolute ethyl ether is added dropwise to a stirred solution of 3.26 g. of lithium aluminum hydride suspended in 50 cc. of absolute ethyl ether. The mixture is refluxed for 6 hours at 35° C. with stirring. Then, the excess of the reducing agent is decomposed by addition of 10 cc. of water. After stirring at room temperature (about 20° C.) for 1 hour, the ethyl ether solution is separated by decantation, and the residue is extracted several times with ethyl ether. The extracts are combined with the ethyl ether solution separated above and dried over anhydrous sodium sulfate. Removing the solvent by distillation, the crude oil obtained is purified by a distillation in vacuo (0.05 mm. Hg). The distillation fraction from 152° to 164° C. yields 0.824 g. of 1'-(ω-dimethylaminopropyl)-1,4 - dimethyl-5,7-dihydroxy-bicyclo(2,2,2)octano(2,3:3', 4')pyrrolidine.

Formulae of additional exemplary compounds within the scope of the instant invention are set forth as Formulae XIII to XXXI. The compounds of said formulae are prepared according to the processes of Examples 1 to 9, supra.

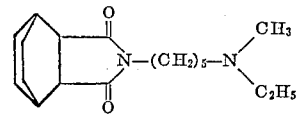

(XIII)

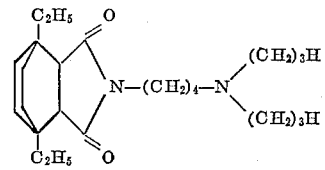

(XIV)

This invention may be embodied in other specific forms without departing from the spirit or essential characteristics thereof. The present embodiments are therefore to be considered in all respects as illustrative, the scope of the invention being indicated by the appended claims rather than by the foregoing description, and all changes which come within the meaning and range of equivalency of the claims are therefore intended to be embraced therein.

This application is a continuation-in-part of application Serial No. 817,067, filed on June 1, 1959, now abandoned.

Having thus described our invention, we claim:

1. A compound of the formula wherein A is a member selected from the group consisting of —N=di(lower)alkyl, —N=di(lower)alkenyl, morpholino, piperidino, pyrrolidino, piperazino and N-methyl piperazino, the lower alkyl having from 1 to 5 carbon atoms and the lower alkenyl having from 2 to 5 carbon atoms; $R_0$ is a member selected from the group consisting of a hydrogen atom and lower alkyl of at most 3 carbon atoms; $R_1$ is a member selected from the group consisting of a hydrogen atom and lower alkyl of at most 3 carbon atoms; $R_2$ is a member selected from the group consisting of

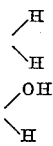

and =O; and $n$ is an integer from 2 to 5.

2. 1'-(ω - dimethylaminoethyl) - 5,7-dihydroxy-bicyclo(2,2,2)octano(2,3:3',4')pyrrolidine.

3. 1'-(ω-dimethylaminopropyl)-5,7-dihydroxy - bicyclo(2,2,2)octano(2,3:3',4')pyrrolidine.

4. 1'-(ω-dimethylaminopropyl)-1,4-dimethyl-5,7 - dihydroxy-bicyclo(2,2,2)octano(2,3:3',4')pyrrolidine.

5. 1'-(ω-diethylaminobutyl)-5,7-dihydroxy-bicyclo (2,2,2)octano(2,3:3',4')pyrrolidine.

6. 1'-[ω-di(lower)alkylamino(lower)alkyl] - 5,7-dihydroxy-bicyclo(2,2,2,)octano(2,3:3',4')pyrrolidine.

7. 1' - [ω - di(lower)alkylamino(lower)alkyl] - 1,4 - di(lower)alkyl - 5,7 - dihydroxy - bicyclo(2,2,2)octano(2,-3:3',4') pyrrolidine.

8. 1'-(ω-dimethylaminopropyl)-5,7-dioxo - bicylo (2,2,2)octano(2,3:3',4')pyrrolidine.

9. 1' - [ω - di(lower)alkylamino(lower)alkyl] - 5,7-dioxo-bicyclo(2,2,2)octano(2,3:3',4')pyrrolidine.

10. 1' - [ω-di(lower)alkylamino(lower)alkyl] - 1,4 - di(lower)alkyl - 5,7-dioxo - bicyclo(2,2,2)octano(2,3:3',4') pyrrolidine.

11. 1'-[ω - di(lower)alkylamino(lower)alkyl] - bicyclo(2,2,2)octano(2,3:3',4')pyrrolidine.

12. A compound of the formula

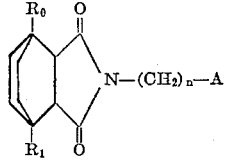

wherein A is a member selected from the group consisting of —N=di(lower)alkyl, —N=di(lower)alkenyl, morpholino, piperidino, pyrrolidino, piperazino and N-methyl piperazino, the lower alkyl having from 1 to 5 carbon atoms and the lower alkenyl having from 2 to 5 carbon atoms; each of $R_0$ and $R_1$ is independently a member selected from the group consisting of a hydrogen atom and lower alkyl of at most 3 carbon atoms; and $n$ is an interger from 2 to 5.

13. 1' - [ω-di(lower)alkylamino(lower)alkyl]-2',5'-dioxo-bicyclo(2,2,2)octano(2,3:3',4')pyrrolidine.

14. A compound of the formula

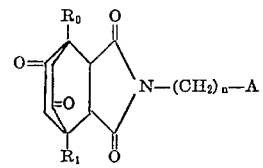

wherein A is a member selected from the group consisting of —N=di(lower)alkyl, —N=di(lower)alkyenyl morpholino, piperidino, pyrrolidino, piperazino and N-methyl piperazino, the lower alkyl having from 1 to 5 carbon atoms and the lower alkenyl having from 2 to 5 carbon atoms; $R_0$ is a member selected from the group consisting of a hydrogen atom and lower alkyl of at most 3 carbon atoms; $R_1$ is a member selected from the group consisting of a hydrogen atom and lower alkyl of at most 3 carbon atoms; and $n$ is an integer from 2 to 5.

15. 1' - (ω - dimethylaminoethyl) - 5,7,2',5' - tetraoxo bicyclo(2,2,2)octano(2,3:3',4')pyrrolidine.

16. 1'-(ω-dimethylaminopropyl)-5,7,2',5'-tetraoxo - bicyclo(2,2,2)octano(2,3:3',4')pyrrolidine.

17. 1'-(ω-dimethylaminopropyl)-1,4 - dimethyl - 5,7,2',5'-tetraoxo-bicyclo(2,2,2)octano(2,3:3',4')pyrrolidine.

18. 1'-(ω - diethylaminobutyl)-5,7,2',5' - tetraoxo - bicyclo(2,2,2)octano(2,3:3',4')pyrrolidine.

19. 1'-[ω-di(lower)alkylamino(lower)alkyl] - 5,7,2',5'-tetraoxo-bicyclo(2,2,2)octano(2,3:3',4')pyrrolidine.

20. 1'-[ω - di(lower)alkylamino(lower)alkyl] - 1,4-di(lower)alkyl - 5,7,2',5'-tetraoxo-bicyclo(2,2,2)octano(2,3:3',4')pyrrolidine.

References Cited in the file of this patent
FOREIGN PATENTS
760,039     Great Britain _ _ _ _ _ _ _ _ _ _ _ Oct. 31, 1956

OTHER REFERENCES
Rice et al.: J. American Chem. Soc., volume 75, pages 4911–4915 (1953).
Takeda et al.: Japanese Heart Journal, volume 1, No. 2, pages 189–197 (1960).